(12) United States Patent
Schmitz et al.

(10) Patent No.: US 8,967,313 B2
(45) Date of Patent: Mar. 3, 2015

(54) FRONT HOOD FOR A MOTOR VEHICLE

(75) Inventors: Uwe Schmitz, Nauheim (DE); Bernd Dreyer, Taunusstein (DE); Grace Thompson, Ruesselsheim (DE); Joachim Schaefer, Darmstadt (DE); Joerg Fuge, Worms (DE); Anett Kilian, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 552 days.

(21) Appl. No.: 13/102,785

(22) Filed: May 6, 2011

(65) Prior Publication Data

US 2011/0278081 A1 Nov. 17, 2011

(30) Foreign Application Priority Data

May 15, 2010 (DE) .......................... 10 2010 020 651

(51) Int. Cl.
*B62D 25/10* (2006.01)
*B60R 21/34* (2011.01)

(52) U.S. Cl.
CPC .............. *B62D 25/105* (2013.01); *B60R 21/34* (2013.01); *B60R 2021/343* (2013.01)
USPC ........................................................ 180/69.2

(58) Field of Classification Search
USPC ............ 180/69.2, 69.21; 296/187.04, 193.11, 296/187.03, 187.09, 188–189, 194
See application file for complete search history.

(56) References Cited

U.S. PATENT DOCUMENTS

| | | | |
|---|---|---|---|
| 5,706,908 A * | 1/1998 | Sakai et al. | 180/69.2 |
| 6,458,451 B1 * | 10/2002 | Steidl et al. | 428/308.4 |
| 6,824,202 B2 | 11/2004 | Vismara et al. | |
| 6,848,738 B2 | 2/2005 | Kempf et al. | |
| 7,150,496 B2 | 12/2006 | Fujimoto | |
| 7,997,642 B2 * | 8/2011 | Rocheblave et al. | 296/193.11 |
| 2009/0195020 A1 | 8/2009 | Wang et al. | |
| 2010/0140979 A1 * | 6/2010 | Seksaria et al. | 296/193.11 |

FOREIGN PATENT DOCUMENTS

| | | |
|---|---|---|
| DE | 19929048 A1 | 12/1999 |
| DE | 10037628 A1 | 2/2002 |
| DE | 10059795 A1 | 6/2002 |
| DE | 10064345 A1 | 6/2002 |
| DE | 10321294 A1 | 12/2004 |
| DE | 10337869 A1 | 3/2005 |
| DE | 29924726 U1 | 3/2005 |
| DE | 102004035421 A1 | 3/2006 |

(Continued)

OTHER PUBLICATIONS

British Patent Office, British Search Report for Application No. 1107713.8, dated Sep. 7, 2011.

*Primary Examiner* — John Walters
*Assistant Examiner* — James Triggs
(74) *Attorney, Agent, or Firm* — Ingrassia Fisher & Lorenz, P.C.

(57) ABSTRACT

A front hood is provided for a motor vehicle that includes, but is not limited to damping element of plastic arranged between a top structure and a bottom structure. The damping element is glued to the top structure and the bottom structure. In the event of a head impact on the front hood the deformation of the top structure is retarded by the damping element. The damping element in the process supports itself on the bottom structure.

6 Claims, 1 Drawing Sheet

(56) References Cited

FOREIGN PATENT DOCUMENTS

| DE | 102005044818 | A1 | 4/2007 |
|----|--------------|----|--------|
| DE | 102008032473 | A1 | 1/2009 |
| EP | 0992418 | A2 | 4/2000 |
| EP | 1022199 | A2 | 7/2000 |
| EP | 1357018 | A1 | 10/2003 |
| EP | 1362768 | A2 | 11/2003 |

* cited by examiner

FRONT HOOD FOR A MOTOR VEHICLE

CROSS-REFERENCE TO RELATED APPLICATION

This application claims priority to German Patent Application No. 102010020651.2, filed May 15, 2010, which is incorporated herein by reference in its entirety.

TECHNICAL FIELD

The technical field relates to a front hood for a motor vehicle with a top structure comprising an outer skin and with a bottom structure arranged under the top structure, with a damping element of plastic arranged between the top structure and the bottom structure.

BACKGROUND

Such a front hood is known for example from EP 1 022 199 B1. With this front hood an intermediate layer of a combination of permanently deformable parts is arranged between a covering shell and a bottom structure. The covering shell in this case is indirectly mounted above the intermediate layer in a floating manner.

A front hood is known for example from DE 10 2004 035 421 A1. With this front hood the bottom structure is designed as spider's net-shaped skeleton. By doing so it is intended in the event of a head impact of a pedestrian on the centre of the front hood to keep the deformation of the latter as small as possible and avoid contact with a combustion engine arranged below. The impact energy is removed through the deformation of the top structure and of the bottom structure. In addition, such a front hood is known from DE 10 2005 044 818 A1. With this front hood the bottom structure has an outer circumferential frame and a central support element. The central support element is connected to the frame via braces. Through a suitable selection of recesses between the braces, the frame and the support element the stiffness of the various regions of the front hood can be simply adjusted.

In addition, a front hood has become known from DE 100 37 628 A1, wherein the outer skin on the bottom is provided with an energy-absorbing material. The energy-absorbing material thus forms a bottom structure. The reliable fastening of the energy-absorbing material to the outer skin proves to be very difficult however.

Disadvantageous with the known front hoods is that the adjusting of the stiffness and of the deformation behavior for a pedestrian impact is difficult.

In view of the foregoing, at least one objective configuring a front hood of the type mentioned at the outset so that it makes possible the particularly accurate adjustment of the stiffness and has a particularly low weight. In addition, other objectives, desirable features and characteristics will become apparent from the subsequent summary and detailed description, and the appended claims, taken in conjunction with the accompanying drawings and this background.

SUMMARY

A damping element is materially connected to the top structure and supported by the bottom structure. Through this configuration the damping element contributes to the stiffness of the front hood. The top structure and the bottom structure can be embodied particularly thin-walled as a result. Because of this, the front hood has a particularly low weight. The damping element produced from plastic is able to support the top structure upon a head impact and be deformed in the process. Supporting the top structure in this case is effected aerially, so that severe local deformations of the top structure are avoided. Because of the arrangement between the top structure and the bottom structure the damping element supports itself on the bottom structure during the deformation. Because of this, the deformation energy can be removed particularly specifically as a result.

According to an embodiment, the top structure is supported over a particularly large area upon a head impact on the front hood if the damping element is designed in one piece and is arranged in the centre of the top structure spaced from the edge of the top structure. By doing so, the stability of the front hood can be simply adjusted over the entire area of the outer skin.

According to another embodiment, the damping element is reliably fixed in its position if the bottom structure is fastened to the top structure via a plurality of support points and if the damping element at least partially encloses individual support points. The manufacture of the damping element proves to be particularly simple according to another advantageous further development of the invention if the damping element is produced from hardening plastic foam.

According to another embodiment, the front hood can be produced particularly cost-effectively in a large series if the damping element is designed as insertion part between top structure and bottom structure. In addition, the strength of the damping element can be adjusted particularly accurately as a result. The constructional effort for fastening the insertion part between the top structure and the bottom structure can be kept particularly low according to another advantageous further development of the invention if the damping element designed as insertion part is provided with hardening plastic foam on both sides.

Fastening the damping element between the top structure and the bottom structure proves to be particularly simple according to another advantageous further development of the invention if the damping element is materially connected to the bottom structure. Preferentially, the damping element produced as hardening plastic foam adheres to the top structure and to the bottom structure. With the damping element designed as insertion part the hardening plastic foam preferentially adheres both to the insertion part as well as to the top structure and the bottom structure.

According to another embodiment, the damping element can be produced particularly cost-effectively if the damping element is produced from polyurethane. Polyurethane can be simply produced as foam and/or as molded part and glued to the top structure and the bottom structure. According to another embodiment, the front hood can be simply adjusted if the top structure and the bottom structure are produced from sheet steel.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
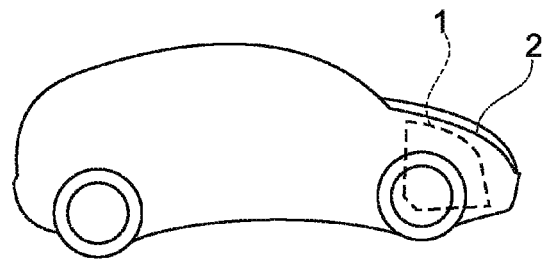
FIG. 1 is schematically a motor vehicle with a front hood.

FIG. 1 schematically shows a lateral view of a motor vehicle with a front hood 2 covering a drive unit 1. The front hood 2 is arranged at the end of the motor vehicle facing in the intended driving direction and has a slight clearance to the drive unit 1. The drive unit 1 can be a combustion engine or an energy storage unit of an electric drive.

Figure 2:
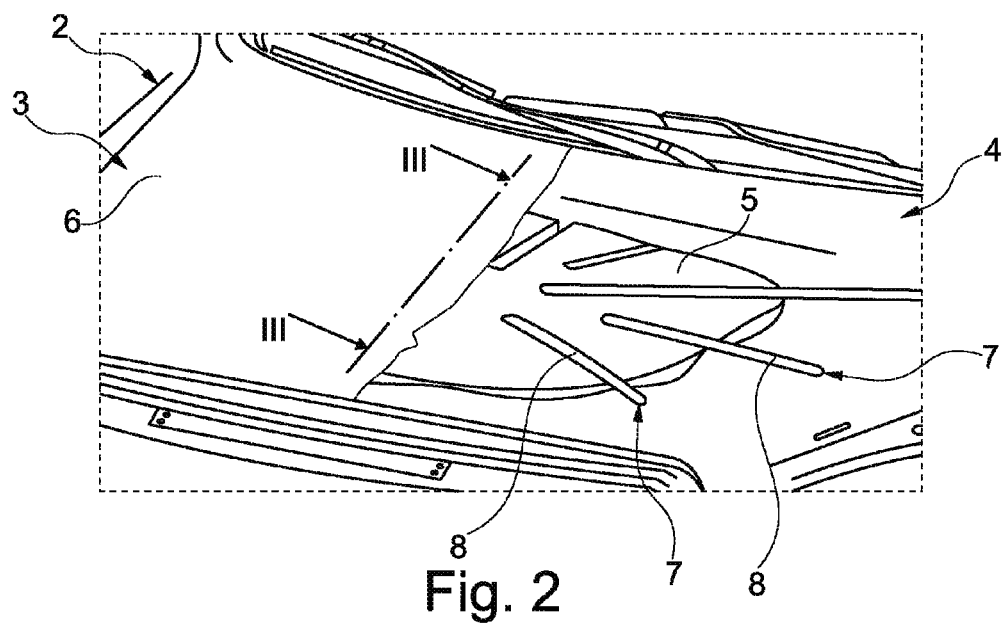
FIG. 2 enlarged a part region of the motor vehicle from FIG. 1 comprising the front hood.

FIG. 2 shows enlarged the end of the motor vehicle from FIG. 1 comprising the front hood 2 in a perspective representation. The front hood 2 has a top structure 3 and a bottom structure 4 and a damping element 5 arranged between the top structure 3 and the bottom structure 4. To explain the construction of the front hood 2 the top structure 3 is represented in part section. The top structure 3 has an outer skin 6 of the motor vehicle and is produced from sheet steel. The bottom structure 4 has a plurality of stampings 7 and support points 8 and is likewise produced from sheet steel. By way of the support points 8 the bottom structure 4 is connected to the top structure 3 for example through gluing or welding. The bottom structure 4 encloses the support points 8 partially and aerially extends over more than approximately 50% of the surface area of the top structure 3. The damping element 5 is produced from plastic as hardened foam or as insertion part and materially connected to the top structure 3 and the bottom structure 4. The plastic in this case is polyurethane.

Figure 3:
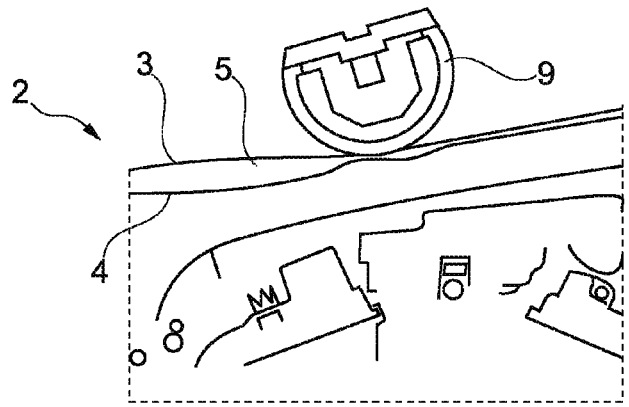
FIG. 3 is a sectional representation through the front hood from FIG. 2 along the line III-III.

FIG. 3 shows a sectional representation through the region of the motor vehicle from FIG. 1 comprising the front hood 2 during a head impact. An impact body 9 simulating a head presses onto the outer skin 6 and thus onto the top structure 3. The top structure 3 is supported by the damping element 5. The damping element 5 is deformed and additionally supports itself on the bottom structure 4. Because of this, a clearance between the bottom structure 4 and the drive unit 1 is ensured.

In the above summary and description an embodiment has been explained as an example. In addition, multiple additional embodiments that have not been mentioned do exist. With the description of merely one or even a plurality of exemplary embodiments it is not intended to restrict the scope of protection, of the application or of the embodiment in any way whatsoever. The preceding description is to merely provide the person skilled in the art with an instruction to realize the invention in the manner described. In addition to this, further changes in the functions and the arrangement of the elements of the exemplary embodiment described are conceivable without leaving the extent of protection as defined by the patent claims and their equivalents.

What is claimed is:

1. A front hood for a motor vehicle, comprising:
   a top structure comprising an outer skin;
   a bottom structure arranged under the top structure;
   a plastic damping element arranged between the top structure and the bottom structure, the plastic damping element materially connected to the top structure and the bottom structure; and
   a plurality of support points configured to fasten the bottom structure to the top structure and the plastic damping element is configured to at least partially enclose individual support points of the plurality of support points,
   wherein the plastic damping element supports the top structure and the plastic damping element is supported by the bottom structure.

2. The front hood according to claim 1, wherein the plastic damping element is a single piece and substantially arranged in a center of the top structure spaced from an edge of the top structure.

3. The front hood according to claim 1, wherein the plastic damping element is formed with a hardening plastic foam.

4. A front hood for a motor vehicle, comprising:
   a top structure comprising an outer skin;
   a bottom structure arranged under the top structure;
   a plastic damping element arranged between the top structure and the bottom structure, the plastic damping element materially connected to the top structure and supported by the bottom structure;
   wherein the plastic damping element is an insertion part configured for insertion between the top structure and the bottom structure, which includes a hardening plastic foam on both sides of the insertion part.

5. The front hood according to claim 1, wherein the plastic damping element is formed from polyurethane.

6. The front hood according to claim 1, wherein the top structure and the bottom structure are formed from sheet steel.

* * * * *